United States Patent
Yamashita et al.

(10) Patent No.: US 11,299,623 B2
(45) Date of Patent: Apr. 12, 2022

(54) THERMOPLASTIC RESIN COMPOSITION, MOLDED RESIN ARTICLE THEREOF, AND COATED ARTICLE

(71) Applicant: Techno-UMG Co., Ltd., Tokyo (JP)

(72) Inventors: Shinji Yamashita, Ube (JP); Hiroshi Sakai, Ube (JP)

(73) Assignee: Techno-UMG Co., Ltd., Tokyo (JP)

( * ) Notice: Subject to any disclaimer, the term of this patent is extended or adjusted under 35 U.S.C. 154(b) by 0 days.

(21) Appl. No.: 16/624,657

(22) PCT Filed: Jun. 18, 2018

(86) PCT No.: PCT/JP2018/023111
§ 371 (c)(1),
(2) Date: Dec. 19, 2019

(87) PCT Pub. No.: WO2019/003981
PCT Pub. Date: Jan. 3, 2019

(65) Prior Publication Data
US 2020/0181400 A1     Jun. 11, 2020

(30) Foreign Application Priority Data
Jun. 26, 2017  (JP) .............................. JP2017-124632

(51) Int. Cl.
*C08L 69/00* (2006.01)
*C08F 212/10* (2006.01)
*C08F 279/04* (2006.01)
*C08L 51/04* (2006.01)

(52) U.S. Cl.
CPC ............ *C08L 69/00* (2013.01); *C08F 212/10* (2013.01); *C08F 279/04* (2013.01); *C08L 51/04* (2013.01); *C08L 2203/20* (2013.01); *C08L 2205/035* (2013.01)

(58) Field of Classification Search
CPC . C08F 212/10; C08F 279/04; C08I 2205/035; C08I 69/00; C08I 25/12; C08I 51/04; C08L 25/12; C08L 33/16; C08L 55/02
See application file for complete search history.

(56) References Cited

U.S. PATENT DOCUMENTS

| | | | | |
|---|---|---|---|---|
| 2002/0120062 A1* | 8/2002 | Nagahara | ............... | G06Q 10/00 525/73 |
| 2010/0152358 A1* | 6/2010 | Jung | ............... | C08L 69/00 524/504 |
| 2010/0273922 A1* | 10/2010 | Fujimoto | ............... | C08L 67/02 524/145 |
| 2011/0021677 A1* | 1/2011 | Kwon | ............... | C08L 69/00 524/115 |
| 2014/0322509 A1* | 10/2014 | Meyer | ............... | B32B 27/08 428/216 |
| 2015/0247037 A1* | 9/2015 | Sugioka | ............... | C08L 69/00 524/504 |
| 2016/0319128 A1* | 11/2016 | Park | ............... | C08L 25/12 |

FOREIGN PATENT DOCUMENTS

| | | | |
|---|---|---|---|
| EP | 2907851 A1 | | 8/2015 |
| JP | H07258501 A | | 10/1995 |
| JP | 09302210 A | * | 11/1997 |
| JP | H09302210 A | | 11/1997 |
| JP | H11293102 A | | 10/1999 |
| JP | 2002-256043 A | | 9/2002 |
| JP | 2004-143287 A | | 5/2004 |
| JP | 2012-036384 A | | 2/2012 |
| JP | 2012-207214 A | | 10/2012 |
| JP | 5998299 B1 | | 9/2016 |

OTHER PUBLICATIONS

Information Statement mailed by Japanese Patent Office dated Jul. 14, 2020, for Japanese Patent Application No. 2017-124632.
International Search Report, Prepared by the Japanese Patent Office as International Searching Authority for PCT/JP2018/023111, dated Jul. 31, 2018 (2 pages).
Office Action for Indian Patent Application No. 201917051555 dated Oct. 6, 2020 (5 pages).
Supplementary European Search Report for European Application No. 18824022.0 dated Feb. 24, 2021 (7 pages).
Search Report for Chinese Patent Application No. 201880041942.0, dated May 24, 2021 (8 pages).

* cited by examiner

*Primary Examiner* — Mark S Kaucher
(74) *Attorney, Agent, or Firm* — Goodwin Procter LLP

(57) ABSTRACT

The present invention provides a thermoplastic resin composition in which occurrence of an absorption phenomenon in a coating step can be suppressed and which is excellent in terms of impact resistance, heat resistance, and fluidity during a molding step; a coated article; and a molded resin article obtained by molding the thermoplastic resin composition. The thermoplastic resin composition contains: 35 to 75 parts by mass of an aromatic polycarbonate resin (A); 15 to 35 parts by mass of a rubber-containing graft copolymer (B) obtained by copolymerizing a monomer mixture comprising an aromatic vinyl compound and a vinyl cyanide compound in the presence of a rubbery polymer; and 10 to 50 parts by mass of a rigid copolymer mixture (C) containing a rigid copolymer (C-I) and a rigid copolymer (C-II), in which in the rigid copolymer mixture (C), an amount of the rigid copolymer (C-II) is 20% to 80% by mass in the mixture.

5 Claims, No Drawings

THERMOPLASTIC RESIN COMPOSITION, MOLDED RESIN ARTICLE THEREOF, AND COATED ARTICLE

CROSS-REFERENCE TO RELATED APPLICATIONS

This non-provisional application is a national stage entry of International Patent Application No. PCT/JP2018/023111, filed on Jun. 18, 2018, which claims priority to Japanese Patent Application No. 2017-124632, filed on Jun. 26, 2017, the entire contents of each of which are hereby incorporated by reference.

TECHNICAL FIELD

The present invention relates to a thermoplastic resin composition, a molded resin article thereof and a coated article.

Priority is claimed on Japanese Patent Application No. 2017-124632, filed on Jun. 26, 2017, the amount of which is incorporated herein by reference.

BACKGROUND ART

Molded articles obtained by molding an ABS-based resin are excellent in terms of impact resistance, mechanical strength, and chemical resistance. Therefore, the molded articles are used in a wide variety of fields including office automation (OA) equipment, information and telecommunication equipment, electronic and electrical equipment, household electrical appliances, automobiles, construction, or the like.

In addition, a method of blending an ABS-based resin and an aromatic polycarbonate resin to ensure impact resistance and heat resistance has been widely performed. A composition containing the ABS-based resin and the aromatic polycarbonate resin (hereinafter, also referred to as a "PC/ABS-based resin") has improved impact resistance and heat resistance as compared with ABS-based resin alone. On the other hand, when compared to a case of containing the aromatic polycarbonate resin alone, a case of containing the ABS-based resin and the aromatic polycarbonate resin has more excellent fluidity (moldability) and secondary workability than the case of containing the aromatic polycarbonate resin alone. In addition, the resin composition containing the ABS resin and the aromatic polycarbonate resin is widely used for the purpose of complementing mutually lacking physical properties.

For example, in recent years, in the automobile field, focusing on the excellent impact resistance, heat resistance, and secondary workability (coatability) of the PC/ABS-based resin, it is planned that the composition is used for vehicle interior parts (floor shift, switch panel, and the like) and vehicle exterior parts (spoiler, antenna cover, and the like).

However, the secondary workability (coatability) is easily affected by factors such as properties of resin compositions, molding conditions, coating materials, coating methods, and coating environments. In addition, there is a possibility that coating defects occur. The coatability is particularly likely to be affected by the molding conditions. In a case where the molding conditions are unfavorable, fine unevenness occurs on a coated surface, and as a result, the defective phenomenon referred to as the absorption phenomenon which is gloss unevenness occurs. Therefore, a commercial value of a final product may be remarkably reduced.

In light of these circumstances, a resin composition containing a graft copolymer in which the absorption phenomenon is suppressed has been proposed (Patent Document 1).

However, the absorption phenomenon is likely to occur in a case where manufacturing is performed under high-speed molding conditions or in a case where a coating material having strong attack properties is used, and the absorption phenomenon may not be sufficiently suppressed in the resin composition disclosed in Patent Document 1. On the other hand, from a viewpoint that in order to attempt an efficient production system using the manufacturing of a wide variety of products in small quantities of productions, a molding cycle for the molded article is shortened, thereby performing production under high-speed molding conditions, or a viewpoint of productivity, it is demanded to use the coating material having strong attack properties.

Accordingly, a resin composition capable of sufficiently suppressing the absorption phenomenon even under these conditions is demanded.

CITATION LIST

Patent Literature

[Patent Document 1] Japanese Unexamined Patent Application, First Publication No. 2004-143287

DISCLOSURE OF INVENTION

Technical Problem

An object of the present invention is to provide a thermoplastic resin composition in which occurrence of an absorption phenomenon in a coating step can be suppressed and which is excellent in terms of impact resistance, heat resistance, and fluidity during a molding step, a molded resin article, and a coated article obtained by molding the thermoplastic resin composition.

Solution to Problem

As a result of intensive studies to achieve the above object, the present inventors found that by using a resin composition containing a specific composition, a thermoplastic resin composition in which occurrence of an absorption phenomenon can be suppressed in a coating step for a molded resin article and which is excellent in terms of impact resistance, heat resistance, and fluidity during a molding step can be obtained, and completed the invention described below.

That is, a thermoplastic resin composition of the present embodiment containing: 35 to 75 parts by mass of an aromatic polycarbonate resin (A); 15 to 35 parts by mass of a rubber-containing graft copolymer (B) obtained by copolymerizing a monomer mixture containing an aromatic vinyl compound and a vinyl cyanide compound in the presence of a rubber polymer; and 10 to 50 parts by mass of a rigid copolymer mixture (C) containing a rigid copolymer (C-I) and a rigid copolymer (C-II), in which in the rigid copolymer mixture (C) an amount of the rigid copolymer (C-II) is 20% to 80% by mass in the mixture, the rigid copolymer (C-I) is a polymer containing a monomer unit derived from an aromatic vinyl compound and a monomer unit derived from a vinyl cyanide compound and is a rigid copolymer in which 20% by mass or more and less than 35% by mass of a total mass of the rigid copolymer (C-I) is the monomer unit derived from the vinyl cyanide compound, the rigid copolymer (C-II) is a polymer containing a monomer unit derived from an aromatic vinyl compound and a monomer unit derived from a vinyl cyanide compound and is a rigid copolymer in which 35% to 50% by mass of a total mass of the rigid copolymer (C-II) is the monomer unit derived from the vinyl cyanide compound, the thermoplastic resin composition contains an acetone soluble component of which reduced viscosity (ηsp/c) is 0.3 to 0.8 dl/g, and a component content of the vinyl cyanide compound in the acetone soluble component is 25% to 40%.

Here, a component content derived from the rubber polymer in the rubber-containing graft copolymer (B) is desirably 35% to 70% by mass.

The molded resin article and the coated article of the present embodiment are obtained by molding the above described thermoplastic resin composition.

Advantageous Effects of Invention

According to the present embodiment, a thermoplastic resin composition in which occurrence of an absorption phenomenon in a coating step can be suppressed and which is excellent in terms of impact resistance, heat resistance, and fluidity during a molding step, a molded resin article, and a coated article obtained by molding the thermoplastic resin composition can be provided.

BEST MODE FOR CARRYING OUT THE INVENTION

Hereinafter, the present embodiment will be described in detail.

A resin composition of the present embodiment contains an aromatic polycarbonate resin (A), a rubber-containing graft copolymer (B), and a rigid copolymer mixture (C).

[Aromatic Polycarbonate Resin (A)]

The aromatic polycarbonate resin (A) is derived from dihydric phenol, and a viscosity average molecular weight (Mv) thereof is preferably 10,000 to 100,000, and more preferably in a range of 15,000 to 30,000.

When the viscosity average molecular weight (Mv) of the aromatic polycarbonate resin (A) is within the range, impact resistance, heat resistance, and moldability of an obtained molded article are further improved.

Here, the viscosity average molecular weight (Mv) of the aromatic polycarbonate resin (A) is measured using a solution in which methylene chloride is used as a solvent by an Ubbelohde viscometer, and is calculated using the following Schnell viscosity formula.

$$[\eta]=1.23\times10^{-4} M_v^{0.83}$$

(In the formula, η represents the intrinsic viscosity, and Mv represents the viscosity average molecular weight).

The aromatic polycarbonate resin is usually manufactured by reacting dihydric phenol with a carbonate precursor using a solution method or a melting method. The used dihydric phenol may be 2,2-bis(4-hydroxyphenyl)propane (bisphenol A). Furthermore, a part or all thereof may be replaced with other dihydric phenols. Examples of the other dihydric phenols include bis(4-hydroxyphenyl)methane, 1,1-bis(4-hydroxyphenyl)ethane, 2,2-bis(4-hydroxy-3,5-dimethylphenyl)propane, bis(4-hydroxylphenyl)sulfone, and the like. In addition, examples of the carbonate precursor include carbonyl halide, carbonyl ester, haloformate, and the like. Specific examples of the carbonate precursors include phosgene, diphenyl carbonate, dihaloformate of dihydric phenol, and a mixture thereof. In a case of manufacturing the aromatic polycarbonate resin, an appropriate molecular weight modifier, a branching agent, a catalyst for promoting a reaction, or the like can be used.

In the present embodiment, two or more kinds of aromatic polycarbonate resins manufactured in this way may be mixed and used. For example, two or more kinds of aromatic polycarbonate resins having different viscosity average molecular weights from each other may be mixed and used by controlling the viscosity average molecular weight preferably.

A amount of the aromatic polycarbonate resin (A) in the thermoplastic resin composition of the present embodiment is preferably 35 to 75 parts by mass with respect to a total of 100 parts by mass of a component (A), a component (B), and a component (C), more preferably 45 to 65 parts by mass, even more preferably 50 to 60 parts by mass. When the amount of the aromatic polycarbonate resin (A) is within the above range, absorption resistance, impact resistance, heat resistance, and moldability in a coating step are further improved. The absorption resistance refers to properties of suppressing occurrence of an absorption phenomenon.

Here, the absorption phenomenon is a phenomenon in which unevenness occurs on a coated surface, resulting in gloss unevenness. By using conventional means such as observing unevenness of the coated surface and the intensity of gloss, occurrence of the absorption phenomenon and the absorption resistance can be confirmed. In the present embodiment, whether or not the absorption phenomenon occurs is determined by visually confirming unevenness of the coated surface.

The impact resistance is properties in which damage or irreversible deformation is not caused upon impact. In the present embodiment, the impact resistance is indicated as a value measured by Charpy impact strength based on ISO 179 as a criterion. In particular, the Charpy impact strength is preferably 30 KJ/m$^2$ or more, and more preferably 40 KJ/m$^2$ or more.

Heat resistance is properties in which damage or irreversible deformation is not caused upon heat. In the present embodiment, the heat resistance is indicated as a value based on ISO 75 as a criterion. In particular, when a measurement load is measured at 1.8 MPa based on ISO 75, a heat resistant temperature is preferably 88° C. or higher, and more preferably 92° C. or higher.

Moldability refers to properties of facilitating molding. "facilitating molding" means, for example, that fluidity is a certain level or higher before cured. In the present embodiment, fluidity is used as a criterion of moldability, and a value obtained by measuring a spiral flow length (mm) is used as the fluidity. In particular, the spiral flow length is preferably 270 mm or more, and more preferably 300 mm or more.

[Rubber-Containing Graft Copolymer (B)]

The rubber-containing graft copolymer (B) according to the present embodiment is a rubber-containing graft copolymer obtained by copolymerizing a monomer mixture containing an aromatic vinyl compound and a vinyl cyanide compound in the presence of a rubber polymer. That is, the rubber-containing graft copolymer (B) according to the present embodiment contains a rigid copolymer component (B') in which the aromatic vinyl compound and the vinyl cyanide compound are graft polymerized in the rubber polymer. In addition to the rigid copolymer component (B'), the rubber-containing graft copolymer (B) may also contain a homopolymer of the aromatic vinyl compound, a homopolymer of the vinyl cyanide compound, and a copolymer obtained by copolymerizing the aromatic vinyl compound and the vinyl cyanide compound. If necessary, rubber-containing graft copolymer (B) according to the present embodiment may also contain components obtained by copolymerizing other copolymerizable compounds in addition to the rubber polymer, the aromatic vinyl compound, and the vinyl cyanide compound.

Examples of the rubber polymer that is a raw material of the rubber-containing graft copolymer (B) include a butadiene-based rubbery polymer such as polybutadiene, styrene-butadiene copolymer, acrylonitrile-butadiene copolymer, and acrylate ester-butadiene copolymer; a conjugated diene-based rubbery polymer such as isoprene, chloroprene, and styrene-isoprene copolymer; an acrylic-based rubbery polymer such as polybutyl acrylate; an olefin-based rubbery polymer such as ethylene-propylene copolymer; a silicone rubbery polymer such as polyorganosiloxane; and natural rubber, butyl rubber, urethane rubber, chlorinated polyethylene, epichlorohydrin rubber, fluororubber, and polysulfide rubber. The rubber polymers may be used singly, or two or more kinds may be used in combination. In addition, the rubbery polymer can use monomers, and a structure of the rubbery polymer may be a composite rubber structure, or a core-shell structure. As the rubber polymer that is a raw material of the rubber-containing graft copolymer (B), polybutadiene is particularly preferable.

The amount of components derived from the rubber polymer in the rubber-containing graft copolymer (B) is preferably 35% to 70% by mass, and more preferably 45% to 60% by mass. When the amount of components derived from a diene rubber polymer is within the above range, absorption resistance, impact resistance, and fluidity in a coating step can be further improved. Examples of the aromatic vinyl compound used as the raw material of the rubber-containing graft copolymer (B) include styrene, α-methylstyrene, para-methylstyrene, and bromostyrene. One of the aromatic vinyl compounds may be used singly, or two or more kinds may be used in combination. Among these, styrene or α-methylstyrene is preferred.

Examples of other copolymerizable compounds which can be used as raw materials for the rubber-containing graft copolymer (B) include methacrylate ester and acrylate ester such as methyl methacrylate and methyl acrylate; maleimide compounds such as N-phenylmaleimide and N-cyclohexylmaleimide; and unsaturated carboxylic acid compounds such as acrylic acid, methacrylic acid, itaconic acid, and fumaric acid. Any one of the other copolymerizable compounds may be used singly or two or more kinds may be used in combination.

The amount of components derived from the other copolymerizable compounds in the rubber-containing graft copolymer (B) is preferably 0% to 10% by mass.

[Rigid Copolymer Mixture (C)]

The rigid copolymer mixture (C) according to the present embodiment contains two kinds of rigid copolymers having specific structures, that is, a rigid copolymer (C-I) and a rigid copolymer (C-II).

The rigid copolymer (C-I) and the rigid copolymer (C-II) contained in the rigid copolymer mixture (C) of the present embodiment are polymers obtained by copolymerizing the aromatic vinyl compound, the vinyl cyanide compound, and other copolymerizable compounds that are used, if necessary. Here, the same compounds as grafting compounds contained in the rubber-containing graft copolymer (B) can be used for the aromatic vinyl compound, the vinyl cyanide compound and other copolymerizable compounds that are used, if necessary.

In the rigid copolymer (C-I), 20% by mass or more and less than 35% by mass of the total mass is composed of monomer units derived from the vinyl cyanide compound.

In the rigid copolymer (C-II), 35% to 50% by mass of the total mass is composed of monomer units derived from the vinyl cyanide compound.

The amount of the rigid copolymer (C-II) contained in the rigid copolymer mixture (C) is 20% to 80% by mass.

Examples of the aromatic vinyl compound which constitutes the rigid copolymer (C-I) include vinyltoluenes such as styrene, α-methylstyrene and ρ-methylstyrene; halogenated styrenes such as ρ-chlorostyrene; and ρ-t-butylstyrene, dimethylstyrene, vinylnaphthalene and the like. One of the aromatic vinyl compounds may be used singly, or two or more kinds may be used in combination. Among the above compounds, styrene and α-methylstyrene are preferred. It is preferable that the aromatic vinyl compound that constitutes the rigid copolymer (C-I) is the same compound as the preferred aromatic vinyl compound that constitutes the rigid copolymer (C-II).

Examples of the vinyl cyanide compound include acrylonitrile, methacrylonitrile, and the like. Among the above compounds, acrylonitrile is preferred. It is preferable that the vinyl cyanide compound that constitutes the rigid copolymer (C-I) is the same compound as the preferred vinyl cyanide compound that constitutes the rigid copolymer (C-II).

The amount of the monomer unit derived from the vinyl cyanide compound contained in the rigid copolymer (C-I) is 20% by mass or more and less than 35% by mass, preferably within a range of 25% to 32% by mass. When the amount of the vinyl cyanide compound contained in the rigid copolymer (C-I) is within the above range, the absorption resistance, the impact resistance, and the fluidity in the coating step are exhibited more effectively.

The amount of the vinyl cyanide compound contained in the rigid copolymer (C-II) is 35% to 50% by mass, and preferably within a range 40% to 45% by mass. When the amount of the vinyl cyanide compound contained in the rigid copolymer (C-II) is within the above range, the absorption resistance, the impact resistance, and the fluidity in the coating step are exhibited more effectively.

The amount of the rigid copolymer (C-II) contained in the rigid copolymer mixture (C) is 20% to 80% by mass, preferably 30% by mass to 70% by mass, and more preferably 40% to 60% by mass. When the amount of the rigid copolymer (C-II) contained in the rigid copolymer mixture (C) is within the above range, the absorption resistance, the impact resistance, and the fluidity in the coating step are exhibited more effectively.

Any conventional polymerization method such as emulsion polymerization, suspension polymerization, bulk polymerization, or a combination thereof can be used as a method of manufacturing the rigid copolymer (C-I) and the rigid copolymer (C-II).

[Other Components]

In the thermoplastic resin composition of the present embodiment, in addition to the aromatic polycarbonate resin (A), the rubber-containing graft copolymer (B), and the rigid copolymer mixture (C), which are essential components, various additives and other resins can be blended as further optional components. In this case, examples of the various additives include known antioxidants, light stabilizers, ultraviolet absorbers, lubricants, plasticizers, stabilizers, transesterification inhibitors, hydrolysis inhibitors, release agents, antistatic agents, colorants (such as pigments and dyes), fillers (such as carbon fiber, glass fiber, wollastonite, calcium carbonate, silica and talc), flame retardants such as brominebased flame retardants and phosphorus-based flame retardants, flame retardant auxiliaries such as antimony trioxide, anti-dripping agents such as fluororesins, antibacterial agents, antifungal agents, silicone oils and coupling agents. These additives can be used singly, or two or more kinds thereof can be used in combination.

Furthermore, examples of other resins include rubber-reinforced styrene-based resins such as HIPS resins, ABS resins, ASA resins, and AES resins, in addition to AS resins, polystyrene resins, nylon resins, methacrylic resins, polyvinyl chloride resins, polybutylene terephthalate resins, polyethylene terephthalate resins, polyphenylene ether resins, and the like. Two or more kinds of the resins may also be blended, and any of the above resins modified by a compatibilizing agent or functional group may also be blended.

Recycled articles which is recovered from polymerization steps, manufacturing steps or molding steps, or recovered from the marketplace can also be used as any of the essential components or optional components used in the present embodiment, as long as quality issues are not caused.

The thermoplastic resin composition contains an acetone soluble component, and the reduced viscosity ($\eta sp/c$) of the acetone soluble component is 0.3 to 0.8 dl/g. Furthermore, 0.4 to 0.7 dl/g is preferable. When the reduced viscosity of the acetone soluble component is within the above range, the absorption resistance, the impact resistance, and the fluidity in the coating step are exhibited more effectively.

The component content of the vinyl cyanide compound in the acetone soluble component is 25% to 40%.

Furthermore, 30% to 40% is preferable. When the component content of the vinyl cyanide compound in the acetone soluble component is within the above range, the absorption resistance, the impact resistance, and the fluidity in the coating step are exhibited more effectively.

<Manufacturing of Thermoplastic Resin Compositions>

The thermoplastic resin composition of the present embodiment is manufactured by mixing and kneading the aromatic polycarbonate resin (A), the rubber-containing graft copolymer (B), the rigid copolymer mixture (C), and any other optional components that are used, if necessary. The thermoplastic resin composition of the present embodiment is used as a molding material for molded resin articles. A method used for mixing and kneading the various components of the thermoplastic resin composition is not limited thereto, and any general mixing and kneading method may be employed. An example thereof includes a method in which kneading is performed using an extruder, Banbury mixer, a kneading roll or the like, and pelletizing and cutting is performed by a pelletizer.

[Molded Resin Article]

The molded resin article and the coated article, whose surface is coated, of xe present embodiment are molded using the above described thermoplastic resin composition of the present embodiment. A molding method thereof can be appropriately selected from conventionally known techniques, and the method is not limited in any way among these techniques. Examples of the molding method include an injection molding method, an extrusion molding method, a compression molding method, an insert molding method, a vacuum molding method, and a blow molding method.

The molded resin article of the present embodiment, which is obtained by molding the thermoplastic resin composition of the present embodiment, exhibits excellent absorption resistance, impact resistance, and fluidity in a coating step.

The molded resin article of the present embodiment can be used preferably for a wide variety of applications including office automation (OA) equipment, information and telecommunication equipment, electronic and electrical equipment, household electrical appliances, automobiles, and construction.

EXAMPLES

The present embodiment is described in detail below together with synthesis examples, examples and comparative examples, but the following examples are not limited unless exceeding the gist thereof.

In the following description, "parts" means "parts by mass".

[Aromatic Polycarbonate Resin (A)]

A commercially available product ("S-2000F" manufactured by Mitsubishi Engineering Plastics Corporation) was prepared as aromatic polycarbonate (A). A viscosity average molecular weight (Mv) of "S-2000F" of the aromatic polycarbonate was 22,000.

In addition, the viscosity average molecular weight of the aromatic polycarbonate resin was measured using a solution in which methylene chloride is used as a solvent by an Ubbelohde viscometer, and is calculated using the following Schnell viscosity formula.

$$[\eta]=1.2\times10^{-4} Mv^{0.83}$$

(In the formula, $\eta$ represents the intrinsic viscosity, and Mv represents the viscosity average molecular weight)

Synthesis Example 1

Rubber-Containing Graft Copolymer (B-1)

175 parts of water, 0.3 parts of beef tallow fatty acid potassium salt, 0.055 parts of potassium hydroxide, and 50 parts of a polybutadiene latex were introduced in a reactor, and then a mixture was heated to 60° C. Subsequently, 0.003 parts of ferrous sulfate, 0.075 parts of sodium pyrophosphate, and 0.173 parts of crystalline glucose were added while holding the temperature at 60° C., and 36.5 parts of styrene. 11.5 parts of acrylonitrile, 0.08 parts of t-dodecylmercaptan and 0.25 parts of cumene hydroperoxide were further added in a continuous manner for 2 hours. Thereafter, the temperature was raised to 70° C. and held at the temperature for one hour to complete the reaction. An antioxidant was added to the latex obtained through the reaction, the latex was solidified by adding sulfuric acid, and the resulting solid was washed thoroughly with water and dried to obtain a rubber-containing graft copolymer (B-1).

Synthesis Example 2

Rubber-Containing Graft Copolymer (B-2)

Polymerization was performed as in Synthesis Example 1, except that an amount of the polybutadiene latex is changed to 35 parts, an amount of styrene is changed to 49 parts and an amount of acrylonitrile is changed to 16 parts, so as to obtain a rubber-containing graft copolymer (B-2).

Synthesis Example 3

Rubber-Containing Graft Copolymer (B-3)

Polymerization was performed as in Synthesis Example 1, except that the amount of the polybutadiene latex is changed to 70 parts, the amount of styrene is changed to 23 parts and the amount of acrylonitrile is changed to 7 parts, so as to obtain a rubber-containing graft copolymer (B-3).

Synthesis Example 4

Rigid Copolymer (C-I-1)

125 parts of water, 0.38 parts of calcium phosphate, 0.0025 parts of potassium alkenylsuccinate, 0.04 parts of 1,1,3,3-tetramethylbutylperoxy-2-ethylhexanoate, 0.06 parts of 1,1-di(t-hexylperoxy)cyclohexane, 0.03 parts of t-butylperoxy-2-ethylhexyl carbonate, and 0.48 parts of t-dodecylmercaptan; and a monomer mixture composed of 68 parts of styrene and 32 parts of acrylonitrile were introduced in a reactor, and then a mixture was reacted. The reaction was performed by heating and raising the temperature from an initial temperature of 65° C. to a temperature of 125° C. for 6.5 hours while sequentially adding parts of the water, the acrylonitrile, and the styrene. In addition, after performing the reaction at 125° C. for one hour, the polymer was removed to obtain a rigid copolymer (C-I-1).

A compositional ratio of the obtained rigid copolymer (C-I-1) is shown in Table 1. The amount of the monomer unit derived from the vinyl cyanide compound contained in the rigid copolymer (C-I-1) was 32.0% by mass.

Synthesis Example 5

Rigid Copolymer (C-I-2)

Polymerization was performed as in Synthesis Example 4, except that an amount of t-dodecylmercaptan is changed to 1.5 parts, so as to obtain a rigid copolymer (C-I-2). The amount of the monomer unit derived from the vinyl cyanide compound contained in the obtained rigid copolymer (C-I-2) was 31.9% by mass.

Synthesis Example 6

Rigid Copolymer (C-I-3)

Polymerization was performed as in Synthesis Example 4, except that the amount of t-dodecylmercaptan is changed to 0.15 parts, so as to obtain a rigid copolymer (C-I-3). The amount of the monomer unit derived from the vinyl cyanide compound contained in the obtained rigid copolymer (C-I-3) was 31.7% by mass.

Synthesis Example 7

Rigid Copolymer (C-I-4)

Polymerization was performed as in Synthesis Example 4, except that the amount of styrene is changed to 80 parts and the amount of acrylonitrile is changed to 20 parts, so as to obtain a rigid copolymer (C-I-4). The amount of the monomer unit derived from the vinyl cyanide compound contained in the obtained rigid copolymer (B-I-4) was 20.1% by mass.

Synthesis Example 8

Rigid Copolymer (C-I-5) Comparative Article

Polymerization was performed as in Synthesis Example 4, except that the amount of styrene is changed to 55 parts and the amount of acrylonitrile is changed to 45 parts, so as to obtain a rigid copolymer (C-I-5). The amount of the monomer unit derived from the vinyl cyanide compound contained in the obtained rigid copolymer was 44.0% by mass.

Synthesis Example 9

Rigid Copolymer (C-II-1)>

Polymerization was performed as in Synthesis Example 4, except that the amount of styrene is changed to 58 parts, the amount of acrylonitrile is changed to 42 parts, and the amount of t-dodecylmercaptan is changed to 1.00 part, so as to obtain a rigid copolymer (C-II-1). The amount of the monomer unit derived from the vinyl cyanide compound contained in the obtained rigid copolymer (C-II-1) was 41.2% by mass.

Synthesis Example 10

Rigid Copolymer (C-II-2) Comparative Article

Polymerization was performed as in Synthesis Example 4, except that the amount of styrene is changed to 58 parts, the amount of acrylonitrile is changed to 42 pans, and the amount of t-dodecylmercaptan is changed to 1.5 parts, so as to obtain a rigid copolymer (C-II-2). The amount of the monomer unit derived from the vinyl cyanide compound contained in the obtained rigid copolymer (B-II-2) was 40.8% by mass.

Synthesis Example 11

Rigid Copolymer (C-II-3) Comparative Article

Polymerization was performed as in Synthesis Example 4, except that the amount of styrene is changed to 58 parts, the amount of acrylonitrile is changed to 42 parts, and the amount of t-dodecylmercaptan is changed to 0.12 parts, so as to obtain a rigid copolymer (C-II-3), The amount of the monomer unit derived from the vinyl cyanide compound contained in the obtained rigid copolymer (C-II-3) was 40.6% by mass.

<Compositional Ratio between Rigid Copolymer (C-I) and Rigid Copolymer (C-II)

A compositional ratio between the rigid copolymer (C-I) and the rigid copolymer (C-II) was determined by quantifying an amount of residual monomer after the reaction completed using a GC-2014 apparatus manufactured by Shimadzu Corporation, and then the fixed quantity was back-calculated from the quantified value.

Examples 1 to 11, and Comparative Examples 1 to 10

<Manufacturing of Thermoplastic Resin Compositions>

The aromatic polycarbonate resin (A), the rubber-containing graft copolymer (B), and the rigid copolymer (C-I) and the rigid copolymer (C-II) were mixed in the ratios shown in Table 1 and Table 2 to prepare the thermoplastic resin compositions respectively.

The thermoplastic resin compositions of Examples 1 to 11 and the thermoplastic resin compositions of Comparative Examples 1 to 10 were each subjected to melt kneading at a temperature of 240° C. using a 30 mm twin screw extruder (TEX30αmanufactured by The Japan Steel Works, Ltd.) and then pelletized respectively so as to obtain pellets of each of the thermoplastic resin compositions of Examples 1 to 11 and pellets of each of the thermoplastic resin compositions of Comparative Examples 1 to 10.

<Reduced Viscosity (ηsp/c) of Acetone Soluble Component of Thermoplastic Resin Composition>

The acetone soluble component of the thermoplastic resin composition was extracted, and then insoluble components were precipitated by centrifugation to obtain a solid amount of the acetone soluble component. The reduced viscosity (ηsp/c) was measured using a solution in which 0.2 g of the obtained solid content was dissolved in 100 ml of 2-butanone at 25° C. by using an Ubbelohde capillary <Content of Vinyl Cyanide Compound in Acetone Soluble Component of Thermoplastic Resin Composition (%)>

The acetone soluble component of the thermoplastic resin composition was extracted, and then insoluble components were precipitated by centrifugation to obtain a solid amount of the acetone soluble component. The obtained solid content was measured by an elemental analyzer (CHN measurement), and the amount of the vinyl cyanide compound was calculated from the amount of nitrogen.

<Evaluation of Coatability (Absorption Properties)>

The pellets of the thermoplastic resin compositions of Examples 1 to 11 and the pellets of the thermoplastic resin compositions of Comparative Examples 1 to 10 were each subjected to injection molding using an 85-ton injection molding machine (J85AD-110H manufactured by The Japan Steel Works, Ltd.). The injection molding was performed by using a coating evaluation mold (length: 200 mm x width: 60 mm×thickness: 3 mm) under conditions including a cylinder temperature of 230° C., a mold temperature of 30° C., and three injection rates of low (10 mm/sec), medium (25 mm/sec), and high (50 mm/sec).

Each of the obtained test pieces was spray coated with a urethane-based coating material, the absorption phenomenon that occurred in the molded article was observed visually, and the coatability (absorption properties) was evaluated according to the following criteria. The results are shown in Tables 1 and 2.

A: There is no unevenness on the molded article surface at all, and excellent coatability.

B: There is some partial unevenness on the molded article surface, but no problem in terms of practical application.

C: There is unevenness over the entire molded article surface, and a practical application level is not achieved.

<Evaluation of Charpy Impact Strength>

The pellets of the thermoplastic resin compositions of Examples 1 to 11 and the pellets of the thermoplastic resin compositions of Comparative Examples 1 to 10 were each subjected to injection molding using an 75-ton injection molding machine (J75EII-P manufactured by The Japan Steel Works, Ltd.). The injection molding was performed under conditions including a molding temperature of 250° C. and a mold temperature of 60° C., and then each of test pieces (length: 80 mm×width: 10 mm×thickness: 4 mm) are molded.

Using each of the obtained test pieces, the Charpy impact strength was measured using the method described below. The results are shown in Tables 1 and 2.

The Charpy impact strength was measured in accordance with ISO 179 at a measurement temperature of 23° C., and then was evaluated according to the following criteria.

A: Charpy impact strength is 40 kJ/m$^2$ or higher, and is excellent.

B: Charpy impact strength is 30 kJ/m$^2$ or more and less than 40 kJ/m$^2$, and there is no problem in terms of practical application.

C: Charpy impact strength is less than 30 kJ/m$^2$, and a practical application level is not achieved.

<Evaluation of Heat Resistance>

Using each of the obtained test pieces, the heat resistance was measured using the following method. The results are shown in Tables 1 and 2.

The heat resistance is measured in accordance with ISO 75 at a measurement load of 1.8 MPa, and then was evaluated according to the following criteria.

A: The heat resistant temperature is 92° C. or higher and is excellent.

B: The heat-resistant temperature is 88° C. or higher and less than 92° C., and there is no problem in terms of practical application.

C: The heat resistant temperature is less than 88° C., and a practical application level is not achieved.

<Evaluation of Fluidity (Spiral Flow)>

Using a spiral flow mold (width: 15 mm×thickness: 2 mm) under conditions including a cylinder temperature of 280° C., a mold temperature of 60° C., and an injection pressure of 100 MPa, the pellets of the thermoplastic resin compositions of Examples 1 to 11 and the pellets of the thermoplastic resin compositions of Comparative Examples 1 to 10 were each subjected to injection molding from the 85-ton injection molding machine (J85AD-110H manufactured by The Japan Steel Works, Ltd.). The spiral flow length (mm) of each of the obtained molded articles was measured, and the fluidity (spiral flow) was evaluated according to the following criteria. The results are shown in Tables 1 and 2.

A: Spiral flow length is 300 mm or more and materialistically excellent

B: Spiral flow length is 270 mm or more and less than 300 mm, and there is no problem in terms of practical application C: Spiral flow length is less than 270 mm, and a practical application level is not achieved.

<Overall Evaluation>

Based on the above evaluation results, the thermoplastic resin compositions for which the above evaluations for coatability (absorption properties), Charpy impact strength, heat resistance, and fluidity (spiral flow) were all "A" were determined as "AA" in an overall evaluation. In addition, the thermoplastic resin compositions for which all of the evaluation results were either "A" or "B", and for which three or more "A" of the evaluation results were obtained were determined as "A" in the overall evaluation. Further, compositions for which all of the evaluation results were either "A" or "B", but for which the number of "A" evaluation results was 2 or less were awarded an overall evaluation of "B". Compositions which were evaluated as "C" for even one evaluation were awarded an overall evaluation of "C". The results are shown in Tables 1 and 2.

TABLE 1

| | | Name | Vinyl cyanide compound | Example 1 | Example 2 | Example 3 | Example 4 | Example 5 | Example 6 |
|---|---|---|---|---|---|---|---|---|---|
| Blend of thermoplastic resin composition | Aromatic polycarbonate resin (A) (parts by mass) | A | — | 50 | 50 | 50 | 40 | 70 | 50 |
| | Rubber-containing graft copolymer (A) (parts by mass) | B-1 | — | 30 | — | — | 20 | 20 | 15 |
| | | B-2 | — | — | 30 | — | — | — | — |
| | | B-3 | — | — | — | 30 | — | — | — |

TABLE 1-continued

| | | Name | Vinyl cyanide compound | | | | | | |
|---|---|---|---|---|---|---|---|---|---|
| | Rigid copolymer mixture (C) (parts by mass) | Rigid copolymer (C-I) | C-I-1 | 32.0 | 10 | 10 | 10 | 20 | 5 | 17 |
| | | | C-I-2 | 31.9 | — | — | — | — | — | — |
| | | | C-I-3 | 31.7 | — | — | — | — | — | — |
| | | | C-I-4 | 20.1 | — | — | — | — | — | — |
| | | | C-I-5 | 44.0 | — | — | — | — | — | — |
| | | Rigid copolymer (C-II) | C-II-1 | 41.2 | 10 | 10 | 10 | 20 | 5 | 18 |
| | | | C-II-2 | 40.8 | — | — | — | — | — | — |
| | | | C-II-3 | 40.6 | — | — | — | — | — | — |
| | | Total of (C-I) and (C-II) | | | 20 | 20 | 20 | 40 | 10 | 35 |
| | | (C-II) contained in (C) (% by mass) | | | 50.0 | 50.0 | 50.0 | 50.0 | 50.0 | 51.4 |
| | | Reduced viscosity of acetone soluble component | | | 0.45 | 0.45 | 0.45 | 0.45 | 0.45 | 0.44 |
| | | Content of vinyl cyanide compound in acetone soluble component | | | 36% | 36% | 36% | 36% | 36% | 36% |
| Evaluation result | Coatability (absorption properties) | Low | | | A | A | A | A | A | A |
| | | Medium | | | A | A | A | A | A | A |
| | | High | | | A | A | A | A | A | A |
| | Charpy impact strength (KJ/m$^2$) | | | | 48 | 46 | 55 | 38 | 57 | 43 |
| | | | | | A | A | A | B | A | A |
| | Heat resistance (° C.) | | | | 95 | 97 | 93 | 92 | 100 | 96 |
| | | | | | A | A | A | A | A | A |
| | Fluidity (spiral flow) (mm) | | | | 320 | 330 | 302 | 355 | 272 | 338 |
| | | | | | A | A | A | A | B | A |
| | Overall evaluation | | | | AA | AA | AA | A | A | AA |

| | | Name | Vinyl cyanide compound | Example 7 | Example 8 | Example 9 | Example 10 | Example 11 | Example 12 |
|---|---|---|---|---|---|---|---|---|---|
| Blend of thermoplastic resin composition | Aromatic polycarbonate resin (A) (parts by mass) | A | — | 50 | 50 | 50 | 50 | 50 | 50 |
| | Rubber-containing graft copolymer (A) (parts by mass) | B-1 | — | 35 | 30 | 30 | 30 | 30 | 30 |
| | | B-2 | — | — | — | — | — | — | — |
| | | B-3 | — | — | — | — | — | — | — |
| | Rigid copolymer mixture (C) (parts by mass) | C-I-1 | 32.0 | 7 | 5 | 15 | — | — | — |
| | | C-I-2 | 31.9 | — | — | — | 5 | — | — |
| | | C-I-3 | 31.7 | — | — | — | — | 15 | — |
| | | C-I-4 | 20.1 | — | — | — | — | — | 12 |
| | | C-I-5 | 44.0 | — | — | — | — | — | — |
| | | C-II-1 | 41.2 | 8 | 15 | 5 | 15 | 5 | 8 |
| | | C-II-2 | 40.8 | — | — | — | — | — | — |
| | | C-II-3 | 40.6 | — | — | — | — | — | — |
| | Total of (C-I) and (C-II) | | | 15 | 20 | 20 | 20 | 20 | 20 |
| | (C-II) contained in (C) (% by mass) | | | 53.3 | 75.0 | 25.0 | 75.0 | 25.0 | 40.0 |
| | Reduced viscosity of acetone soluble component | | | 0.46 | 0.47 | 0.43 | 0.33 | 0.75 | 0.44 |
| | Content of vinyl cyanide compound in acetone soluble component | | | 36% | 38% | 34% | 38% | 34% | 29% |
| Evaluation result | Coatability (absorption properties) | Low | | A | A | A | A | A | A |
| | | Medium | | A | A | A | A | A | A |
| | | High | | A | A | A | A | A | B |
| | Charpy impact strength (KJ/m$^2$) | | | 50 | 44 | 47 | 38 | 49 | 47 |
| | | | | A | A | A | B | A | A |
| | Heat resistance (° C.) | | | 94 | 95 | 95 | 94 | 96 | 95 |
| | | | | A | A | A | A | A | A |
| | Fluidity (spiral flow) (mm) | | | 315 | 316 | 323 | 342 | 288 | 325 |
| | | | | A | A | A | A | B | A |
| | Overall evaluation | | | AA | AA | AA | A | A | A |

TABLE 2

| | | Name | Vinyl cyanide compound | Comparative Example 1 | Comparative Example 2 | Comparative Example 3 | Comparative Example 4 | Comparative Example 5 |
|---|---|---|---|---|---|---|---|---|
| Blend of thermoplastic resin composition | Aromatic polycarbonate resin (A) (parts by mass) | A | — | 30 | 80 | 50 | 50 | 50 |
| | Rubber-containing graft copolymer (A) (parts by mass) | B-1 | — | 30 | 10 | 30 | 30 | 30 |
| | | B-2 | — | — | — | — | — | — |
| | | B-3 | — | — | — | — | — | — |
| | Rigid copolymer mixture (C-I) | C-I-1 | 32.0 | 20 | 5 | — | — | — |
| | | C-I-2 | 31.9 | — | — | 10 | — | — |
| | | C-I-3 | 31.7 | — | — | — | 10 | — |

TABLE 2-continued

|  |  |  | Name | Vinyl cyanide compound |  |  |  |  |  |
|---|---|---|---|---|---|---|---|---|---|
|  | (C) (parts by mass) |  | C-I-4 | 20.1 | — | — | — | — | 20 |
|  |  |  | C-I-5 | 44.0 | — | — | — | — | — |
|  |  | Rigid copolymer (C-II) | C-II-1 | 41.2 | 20 | 5 | — | — | — |
|  |  |  | C-II-2 | 40.8 | — | — | 10 | — | — |
|  |  |  | C-II-3 | 40.6 | — | — | — | 10 | — |
|  |  | Total of (C-I) and (C-II) |  |  | 40 | 10 | 20 | 20 | 20 |
|  |  | (C-II) contained in (C) (% by mass) |  |  | 50.0 | 50.0 | 50.0 | 50.0 | 0.0 |
|  | Reduced viscosity of acetone soluble component |  |  |  | 0.45 | 0.45 | 0.20 | 0.94 | 0.50 |
|  | Content of vinyl cyanide compound in acetone soluble component |  |  |  | 36% | 36% | 34% | 34% | 20% |
| Evaluation result | Coatability (absorption properties) | Low |  |  | A | A | A | A | C |
|  |  | Medium |  |  | A | B | A | B | C |
|  |  | High |  |  | A | C | A | C | C |
|  | Charpy impact strength (KJ/m²) |  |  |  | 28 | 60 | 29 | 50 | 48 |
|  |  |  |  |  | C | A | C | A | A |
|  | Heat resistance (°C.) |  |  |  | 87 | 101 | 95 | 98 | 94 |
|  |  |  |  |  | C | A | A | A | A |
|  | Fluidity (spiral flow) (mm) |  |  |  | 360 | 260 | 328 | 267 | 307 |
|  |  |  |  |  | A | C | A | C | A |
|  | Overall evaluation |  |  |  | C | C | C | C | C |

|  |  |  | Name | Vinyl cyanide compound | Comparative Example 6 | Comparative Example 7 | Comparative Example 8 | Comparative Example 9 | Comparative Example 10 |
|---|---|---|---|---|---|---|---|---|---|
| Blend of thermoplastic resin composition | Aromatic polycarbonate resin (A) (parts by mass) |  | A | — | 50 | 50 | 50 | 50 | 50 |
|  | Rubber-containing graft copolymer (A) (parts by mass) |  | B-1 | — | 30 | 40 | 10 | 30 | 30 |
|  |  |  | B-2 | — | — | — | — | — | — |
|  |  |  | B-3 | — | — | — | — | — | — |
|  | Rigid copolymer mixture (C) (parts by mass) | Rigid copolymer (C-I) | C-I-1 | 32.0 | — | 5 | 20 | 17 | 3 |
|  |  |  | C-I-2 | 31.9 | — | — | — | — | — |
|  |  |  | C-I-3 | 31.7 | — | — | — | — | — |
|  |  |  | C-I-4 | 20.1 | — | — | — | — | — |
|  |  |  | C-I-5 | 44.0 | 20 | — | — | — | — |
|  |  | Rigid copolymer (C-II) | C-II-1 | 41.2 | — | 5 | 20 | 3 | 17 |
|  |  |  | C-II-2 | 40.8 | — | — | — | — | — |
|  |  |  | C-II-3 | 40.6 | — | — | — | — | — |
|  |  | Total of (C-I) and (C-II) |  |  | 20 | 10 | 40 | 20 | 20 |
|  |  | (C-II) contained in (C) (% by mass) |  |  | 0.0 | 50.0 | 50.0 | 15.0 | 85.0 |
|  | Reduced viscosity of acetone soluble component |  |  |  | 0.50 | 0.45 | 0.45 | 0.48 | 0.42 |
|  | Content of vinyl cyanide compound in acetone soluble component |  |  |  | 45% | 36% | 36% | 33% | 39% |
| Evaluation result | Coatability (absorption properties) | Low |  |  | A | A | A | B | A |
|  |  | Medium |  |  | A | B | A | C | A |
|  |  | High |  |  | A | C | A | C | A |
|  | Charpy impact strength (KJ/m²) |  |  |  | 25 | 53 | 26 | 52 | 28 |
|  |  |  |  |  | C | A | C | A | C |
|  | Heat resistance (°C.) |  |  |  | 97 | 89 | 97 | 94 | 95 |
|  |  |  |  |  | A | B | A | A | A |
|  | Fluidity (spiral flow) (mm) |  |  |  | 298 | 282 | 334 | 315 | 328 |
|  |  |  |  |  | B | B | A | A | A |
|  | Overall evaluation |  |  |  | C | C | C | C | C |

Based on Tables 1 and 2, by using the thermoplastic resin compositions containing the aromatic polycarbonate resin (A), the rubber-containing graft copolymer (B), and the rigid copolymer mixture (C) within the defined range, molded resin articles that exhibit excellent the absorption resistance, the impact resistance and the heat resistance in the coating step, and the fluidity in the molding step is provided.

INDUSTRIAL APPLICABILITY

According to the present embodiment, a thermoplastic resin composition in which occurrence of an absorption phenomenon in a coating step can be suppressed and which is excellent in terms of impact resistance, heat resistance, and fluidity during a molding step, a molded resin article, and a coated article obtained by molding the thermoplastic resin composition can be provided. As a result, the present embodiment is extremely useful industrially.

What is claimed is:
1. A thermoplastic resin composition comprising:
   35 to 75 parts by mass of an aromatic polycarbonate resin (A);
   15 to 35 parts by mass of a rubber-containing graft copolymer (B) obtained by copolymerizing a monomer mixture containing an aromatic vinyl compound and a vinyl cyanide compound in the presence of a rubber polymer; and
   10 to 50 parts by mass of a rigid copolymer mixture (C) containing a rigid copolymer (C-I) and a rigid copolymer (C-II), wherein the thermoplastic resin composition does not comprise phosphorus-based flame retardants, in the rigid copolymer mixture (C), an amount of the rigid copolymer (C-II) is 20% to 80% by mass in the mixture, the rigid copolymer (C-I) is a polymer containing a monomer unit derived from an aromatic vinyl compound and a monomer unit derived from a vinyl cyanide compound and is a rigid copolymer in which 20% by mass or more and less than 35% by mass of a total mass of the rigid copolymer (C-I) is the monomer unit derived from the vinyl cyanide compound, the rigid copolymer (C-II) is a polymer containing a monomer unit derived from an aromatic vinyl compound and a monomer unit derived from a vinyl cyanide compound and is a rigid copolymer in which 40% to 50% by mass of a total mass of the rigid copolymer (C-II) is the monomer unit derived from the vinyl cyanide compound, the thermoplastic resin composition contains an acetone soluble component of which reduced viscosity ($\eta sp/c$) is 0.3 to 0.8 dl/g, and a component content of the vinyl cyanide compound in the acetone soluble component is 25% to 40%, wherein the thermoplastic resin composition is configured to suppress absorption of a coating material applied to the thermoplastic resin composition.

2. A molded resin article obtained by molding a thermoplastic resin composition, wherein the thermoplastic resin composition comprises:

35 to 75 parts by mass of an aromatic polycarbonate resin (A);

15 to 35 parts by mass of a rubber-containing graft copolymer (B) obtained by copolymerizing a monomer mixture containing an aromatic vinyl compound and a vinyl cyanide compound in the presence of a rubber polymer; and 10 to 50 parts by mass of a rigid copolymer mixture (C) containing a rigid copolymer (C-I) and a rigid copolymer (C-II), wherein the thermoplastic resin composition does not comprise phosphorus-based flame retardants, in the rigid copolymer mixture (C), an amount of the rigid copolymer (C-II) is 20% to 80% by mass in the mixture, the rigid copolymer (C-I) is a polymer containing a monomer unit derived from an aromatic vinyl compound and a monomer unit derived from a vinyl cyanide compound and is a rigid copolymer in which 20% by mass or more and less than 35% by mass of a total mass of the rigid copolymer (C-I) is the monomer unit derived from the vinyl cyanide compound, the rigid copolymer (C-II) is a polymer containing a monomer unit derived from an aromatic vinyl compound and a monomer unit derived from a vinyl cyanide compound and is a rigid copolymer in which 40% to 50% by mass of a total mass of the rigid copolymer (C-II) is the monomer unit derived from the vinyl cyanide compound, the thermoplastic resin composition contains an acetone soluble component of which reduced viscosity ($\eta sp/c$) is 0.3 to 0.8 dl/g, and a component content of the vinyl cyanide compound in the acetone soluble component is 25% to 40%, wherein the molded resin article is configured to suppress absorption of a coating material applied to the molded resin article.

3. A coated article formed of a molded resin article obtained by molding a thermoplastic resin composition, wherein the thermoplastic resin composition comprises:

35 to 75 parts by mass of an aromatic polycarbonate resin (A);

15 to 35 parts by mass of a rubber-containing graft copolymer (B) obtained by copolymerizing a monomer mixture containing an aromatic vinyl compound and a vinyl cyanide compound in the presence of a rubber polymer; and 10 to 50 parts by mass of a rigid copolymer mixture (C) containing a rigid copolymer (C-I) and a rigid copolymer (C-II), wherein the thermoplastic resin composition does not comprise phosphorus-based flame retardants, in the rigid copolymer mixture (C), an amount of the rigid copolymer (C-II) is 20% to 80% by mass in the mixture, the rigid copolymer (C-I) is a polymer containing a monomer unit derived from an aromatic vinyl compound and a monomer unit derived from a vinyl cyanide compound and is a rigid copolymer in which 20% by mass or more and less than 35% by mass of a total mass of the rigid copolymer (C-I) is the monomer unit derived from the vinyl cyanide compound, the rigid copolymer (C-II) is a polymer containing a monomer unit derived from an aromatic vinyl compound and a monomer unit derived from a vinyl cyanide compound and is a rigid copolymer in which 40% to 50% by mass of a total mass of the rigid copolymer (C-II) is the monomer unit derived from the vinyl cyanide compound, the thermoplastic resin composition contains an acetone soluble component of which reduced viscosity ($\eta sp/c$) is 0.3 to 0.8 dl/g, and a component content of the vinyl cyanide compound in the acetone soluble component is 25% to 40%.

4. The thermoplastic resin composition of claim 1, wherein the absorption suppression occurs during a coating step.

5. The coated article of claim 3, wherein the coated article comprises a urethane-based coating material.

* * * * *